United States Patent [19]
Hough et al.

[11] 3,961,017
[45] June 1, 1976

[54] PRODUCTION OF DODECAHYDRODODECABORATE (2-)

[75] Inventors: William Vernon Hough, Evans City; Clarence Robert Guibert, Mars; Gerald Thomas Hefferan, Butler, all of Pa.

[73] Assignee: Mine Safety Appliances Company, Pittsburgh, Pa.

[22] Filed: Mar. 24, 1975

[21] Appl. No.: 561,283

[52] U.S. Cl. ............................................. 423/286
[51] Int. Cl.² ........................................ C01B 35/18
[58] Field of Search .............. 423/286; 260/606.5 B

[56] References Cited
UNITED STATES PATENTS

| 3,328,134 | 6/1967 | Miller et al. | 423/286 |
| 3,882,037 | 5/1975 | Brown | 260/606.5 B |

OTHER PUBLICATIONS
Adams, R. M., *Boron Metallo–Boron Compounds and Boranes*, Interscience Publishers, N.Y., 1964, p. 386.
Hughes, R. L. et al., *Production of the Boranes and Related Research*, Academic Press, N.Y., 1967, pp. 102–103.

*Primary Examiner*—G. O. Peters

[57] ABSTRACT

This invention relates to the preparation of dodecahydrododecaborate (2−) anions and particularly to the preparation of alkali metal dodecahydrododecaborates such as $Na_2B_{12}H_{12}$. The process of the invention involves the reaction of an alkali metal borohydride with dimethylsulfideborane, at a temperature and for a time sufficient, to yield the alkali metal dodecahydrododecaborate. The reaction may be conducted at atmospheric pressure.

10 Claims, No Drawings

PRODUCTION OF DODECAHYDRODODECABORATE (2-)

STATE OF THE ART

Previous methods for the synthesis of dodecahydrododecaborates (2-) anions involve either reactions of diborane or pyrolysis of base borane, e.g., $$2NaBH_4 + 5B_2H_6 \rightarrow Na_2B_{12}H_{12} + 13H_2$$

$$12(C_2H_5)_3NBH_3 \rightarrow [(C_2H_5)_3NH]_2B_{12}H_{12} + 10(C_2H_5)_3N + 11H_2$$

Because of the volatility of starting materials, the above methods have been conducted in sealed bombs or autoclaves such that all materials were contained with no losses or boron-containing materials. Scale-up of these procedures to provide production quantities of $B_{12}H_{12}(2-)$ is difficult and expensive since extremely large vessels are needed to contain the large quantities of hydrogen evolved.

U.S. Pat. No. 3,169,045 and Miller et al., *Inorganic Chemistry*, Vol. 3, 1964, pages 1456–1463, describe dodecahydrododecaborate salts and a method of their preparation.

DESCRIPTION OF THE INVENTION

It has now been found that $B_{12}H_{12}^{-2}$ can be prepared at atmospheric pressure in a process which does not result in the loss of appreciable boroncontaining materials. The hydrogen formed by the reaction can be removed as it is formed.

The process of the invention comprises the reaction of an alkali metal hydride or borohydride with dimethylsulfideborane. The chemical reactions involved can be represented by the following equations:

$$2MH + 12(CH_3)_2SBH_3 \rightarrow M_2B_{12}H_{12} + 13H_2 + 12(CH_3)_2S$$

or $$2MBH_4 + 10(CH_3)_2SBH_3 \rightarrow M_2B_{12}H_{12} + 13H_2 + 12(CH_3)_2S$$

where M is an alkali metal, for example, lithium, sodium, potassium, rubidium or cesium, preferably sodium.

In general, commercial grades of materials are satisfactory. However, it is highly desirable that the reactants be as free of water as is practicable, since moisture, if present, will reduce the yield of the desired product.

The reaction is conducted at atmospheric pressure, pressures other than atmospheric may be employed but merely make the process equipment more costly and complex. The reaction is conducted in an inert atmosphere, for example, under a nitrogen blanket in the substantial absence of moisture, at the desired temperature until the product is formed.

Conveniently, the reaction is conducted in a corrosion resistant vessel, such as stainless steel, having a steam jacket for heating, stirring means, temperature sensing means, means for providing an inert gas atmosphere, and suitable material supply and removal means. The reactor is further equipped with a condenser operated to pass $H_2$ and dimethylsulfide, but to retain other materials. Conveniently, the reactor is connected to a receiver vessel to which the reaction mixture can be transferred for purification. The receiver is preferably further connected to a filter or vacuum kettle for final product isolation. All steps in the sequence are preferably conducted in an inert atmosphere and the substantial absence of water.

Mixing of the reactants is highly desirable, but not essential and mixing can be accomplished by any suitable means.

While the reaction is primarily described herein as a batch reaction, the process can also be conducted as a continuous process with or without recycle of unreacted materials, in whole or in part.

The molar ratio of the reactants is not critical. It is preferable to use the reactant in about stoichiometric proportions, i.e., about 10 mols of dimethylsulfideborane for every 2 mols of alkali metal borohydride. Where an excess of one reactant is present, it is desirable that the dimethylsulfideborane be in excess. It is not necessary, however, to use these ratios to obtain at least some quantity of the desired dodecahydrododecaborates.

The reaction to form the dodecahydrododecaborates is conducted at a temperature of between about 95°C. and about 200°C. and preferably, between about 100°C. and 150°C. Conveniently the reaction is conducted at about 130°C.–140°C. While not necessary, it is most preferable that the reaction mixture be gradually raised, for example, incrementally during the course of the reaction, to the ultimately desired reaction temperature for more control over the reaction and to allow for relatively constant controlled evolution of hydrogen.

Likewise, since the reaction mixture will in most instances contain some small amount of reactive impurities, it is desirable to allow these to be reacted at moderate temperature before the desired reaction is commenced.

In a preferred embodiment, the reaction between the alkali metal borohydride and the dimethylsulfideborane is conducted in the presence of an inert liquid reaction media, i.e. a liquid which is unreactive under the conditions of the reaction with the reactants and the product. Ethers and sulfides are suitable reaction media. The reaction media should be liquid at room temperature and liquid at the desired maximum reaction temperature. The preferred reaction medium comprises diglyme, i.e. the dimethyl ether of diethylene glycol. Other suitable reaction media include other glycol ethers such as monomethyl-, trimethyl and tetramethyl ethers of diethylene glycol, dioxane and lower dialkylsulfides, such as diethylsulfide and dibutylsulfide. The inert liquid dispersant should be as free of moisture as possible. Infrared analysis for hydroxyl is an expedient safeguard prior to use.

The time of the reaction is not critical. The reaction time will generally be between about 5 to about 25 hours in a batch process, although shorter or longer times can be employed, dependent upon equipment limitations to accommodate hydrogen evolution.

The reaction products can be separated from the reaction mixture by conventional procedures, such as filtration, crystallization, solution chromatography and the like.

The alkali metal salts prepared in accordance with this invention are solid products which are salt-like in character and dissolve in water and polar solvents, such as hydroxylate solvents. The compounds, as obtained, frequently contain solvent of crystallization. Solvents of crystallization are readily removed, by conventional procedures, for example, recrystallization, heating under reduced pressure and the like.

The tendency of the salts to crystallize with solvents of crystallization or water of hydration complicates elemental analysis. However, identity of the compounds can be confirmed by strong characteristic absorption bands of the $B_{12}H_{12}$ anion in the infra-red absorption spectrum which appear at $4.0\mu \pm 0.1$ and $9.35\mu \pm 0.1$. The absorption band at $4.0\mu$ in some instances appears as a doublet in which there is a shoulder at $4.0\mu$ band at about $4.11\mu$.

The alkali metal dodecahydrododecaborates undergo metathetic reaction with other salts, in aqueous or non-aqueous solvents, to yield other dodecahydrododecaborate salts having as cations Li, Na, K, Rb, Cs, Be, Mg, Ca, Sr, Ba, Cu, Ag, Zn, Cd, and Hg, ammonium, hydrazonium, N-substituted ammonium, N-substituted hydrazonium, substituted phosphonium, aryldiazonium, and the like.

Compounds containing the dodecahydrododecaborate (2-) anions are useful as sequestering agents to remove metals, such as copper, nickel, cobalt, zinc and cadmium, from aqueous and non-aqueous solutions; lithium dodecahydrododecaborate is useful in modifying the combustion characteristics of hydrocarbon fuels; silver dodecahydrododecaborate is useful in the field of light-sensitive chemicals employed in photography; and mercury dodecahydrododecaborate is useful in biochemical applications for which mercury compounds are frequently employed.

Illustrating the invention is the following examples, which, however, are not to be considered as limiting the invention to their details. All parts and percentages are by weight, unless otherwise specified. All temperatures are degrees Centigrade, unlss otherwise specified.

EXAMPLE

The following process and workup was conducted in a dry nitrogen atmosphere.

Into a one gallon stainless steel reactor, equipped with stirrer, temperature sensing means, means for providing an inert gas atmosphere, an external heating means, a condenser, and means for adding reactants and removing reaction product, was charged 75 grams (2 mols) of sodium borohydride and 1800 ml of diglyme. The mixture stirred for 10–15 minutes to allow for possible interaction.

There was then added 800 grams (10 mols $BH_3$) of dimethylsulfideborane. The dimethylsulfideborane was added to the reaction in small increments to allow reaction of small amounts of hydroxyl impurities with the evolution of hydrogen. The condenser was maintained at 35°–40°C. so that dimethylsulfide and hydrogen evolved were removed while entrained dimethylsulfideborane was returned to the reaction with negligible dissociation.

The reactor jacket was brought to 105°C. and rapid evolution of hydrogen was noted. The temperature of the reaction mixture was 95°–100°C. After about five hours the temperature of the reactor jacket was increased in 10°C. increments as hydrogen evolution decreased until 140°C. was reached after two hours. The reaction mixture was then maintained at 135°C. until hydrogen evolution was very slow (i.e. 3–4 liters/-hour), at least about 12 hours. The total hydrogen evolved was about 105 percent of theory based on wet test meter readings.

There was added to the reaction mixture 700 ml of diglyme, an amount equivalent to the dimethylsulfide removed during the reaction, and the reaction mixture cooled to 50°C. The product $Na_2B_{12}H_{12}$ was in solution.

To a receiver was charged 1500 ml of hexane and then the reactor pressurized with nitrogen and the reaction mixture transferred to the receiver under nitrogen pressure. The resultant slurry was stirred in the receiver for one hour and the liquid was then removed from the slurry. The remaining solids were similarly washed with hexane two additional times. To the remaining solids there was then added 1725 ml of 1,4 dioxane and the resultant slurry stirred for two hours. The fluid portion was removed and the solids were slurried with hexane and the fluid portion then removed. The remaining solids were again slurried in hexane and transferred to a stirrer vacuum pot where the hexane was removed by vacuum distillation.

The resultant solid product was $Na_2B_{12}H_{12}$ containing two to three moles of associated diglyme and/or 1,4 dioxane, mostly diglyme. The material was hydroscopic and was handled with minimum air exposure and stored in air tight containers.

The product was measured for boron content by carbonate fusion to determine the total boron present.

The product was titrated for boron content to determine the presence of $BH_4-$ and $B_3H_8-$.

Infra-red analysis was also performed.

On three repetitions of the above, the following results were obtained:

| | Recovery | Boron Content | Yield of $Na_2B_{12}H_{12}$ Base on Total Boron Charge |
|---|---|---|---|
| Run 1 | 518g | 21.3 | 91.3% |
| Run 2 | 420.2g | 21.4 | 90.4% |
| | 78g | 23.9 | |
| Run 3 | 471.4g | 23.3 | 91% |

The boron analyses were run by carbonate fusion and may be low but not more than 5 percent low. Actual yields may have been 95–96 percent.

The process of the invention is operable to provide a desired product with substantial variation of the above examples, for example, by substituting other alkali metal borohydrides, such as described hereinabove, or by varying the ratio of the reactants, the reaction times, temperatures, or other process variables within the limits discussed above.

According to the provisions of the Patent Statutes, there is described above the invention and what are now considered its best embodiments; however, within the scope of the appended claims, it is understood that the invention can be practiced otherwise than as specifically described.

We claim:

1. A process for preparing an alkali metal dodecahydrododecaborate which comprises reacting at a temperature between about 90°C and about 200°C, in an inert atmosphere and at substantially atmospheric pressure, an alkali metal borohydride or alkali metal hydride with dimethylsulfideborane for a time and at a temperature sufficient to form alkali metal dodecahydrododecaborate and removing hydrogen and dimethylsulfide from said reaction as they are formed.

2. A process, as in claim 1, wherein the reaction is conducted in the presence of an inert liquid dispersant.

3. A process, as in claim 2, wherein the reaction is conducted at a temperature between about 100°C. and about 150°C.

4. A process, as in claim 3, wherein the temperature of the reaction is raised incrementally during the course of the reaction.

5. A process, as in claim 2, wherein the alkali metal borohydride and the dimethylsulfideborane are reacted in about stoichiometric proportions.

6. A process, as in claim 2, wherein the alkali metal borohydride is sodium borohydride.

7. A process, as in claim 2, wherein the inert dispersant comprises diglyme.

8. A process, as in claim 7, wherein the process is conducted at substantially atmospheric pressure at a temperature between about 100°C. and about 150°C.

9. A process, as in claim 8, wherein the temperature of the reaction is raised incrementally during the course of the reaction.

10. A process, as in claim 2, wherein the inert liquid dispersant comprises diglyme.

* * * * *